(12) United States Patent
Roberts et al.

(10) Patent No.: US 9,641,209 B2
(45) Date of Patent: May 2, 2017

(54) APPLICATOR

(71) Applicant: Tech 21 Licensing Limited, Twickenham (GB)

(72) Inventors: Jason Roberts, Twickenham (GB); Wilhelm Marschall, London (GB); Benjamin Thorpe, Uxbridge (GB)

(73) Assignee: TECH 21 LICENSING LIMITED, Twickenham, Middlesex (GB)

( * ) Notice: Subject to any disclaimer, the term of this patent is extended or adjusted under 35 U.S.C. 154(b) by 0 days.

(21) Appl. No.: 14/586,189

(22) Filed: Dec. 30, 2014

(65) Prior Publication Data
US 2015/0194996 A1 Jul. 9, 2015

(30) Foreign Application Priority Data

Jan. 3, 2014 (GB) .................................. 1400082.2

(51) Int. Cl.
*H04B 1/38* (2015.01)
*H04B 1/3888* (2015.01)
(Continued)

(52) U.S. Cl.
CPC ........... *H04B 1/3888* (2013.01); *B29C 63/02* (2013.01); *H04M 1/026* (2013.01);
(Continued)

(58) Field of Classification Search
CPC . B29C 63/0004; B29C 63/0047; B29C 63/02; B29C 2063/027; H04M 1/18
See application file for complete search history.

(56) References Cited

U.S. PATENT DOCUMENTS

| 6,003,052 A | 12/1999 | Yamagata |
| 8,675,353 B1* | 3/2014 | Alonzo ................ G06F 1/1628 361/679.01 |

(Continued)

FOREIGN PATENT DOCUMENTS

| CN | 202987565 | 6/2013 |
| GB | 2480450 | 11/2011 |

(Continued)

OTHER PUBLICATIONS

European Search Report dated May 29, 2014 in corresponding GB Application No. 1400079.8.

(Continued)

*Primary Examiner* — Nizar Sivji
(74) *Attorney, Agent, or Firm* — Stephen J. Weyer, Esq.; Stites & Harbison, PLLC

(57) ABSTRACT

An applicator for aligning a screen protector on a portable electronic device (D) with a screen, four edges and a rear face opposite to the screen. The applicator comprises a body with an engagement member (2, 11) and an alignment feature (3, 5, 12, 13). The engagement member (2, 11) is arranged for edgewise engagement with no more than three of the four edges of the device (D) to align the applicator with the device by movement in a direction generally parallel to the plane of the screen such that the alignment feature (3, 5, 12, 13) covers a portion of the face of the device comprising the screen which is not covered by the screen protector allowing an edge of the screen protector to be located with respect to the alignment feature.

24 Claims, 6 Drawing Sheets

(51) Int. Cl.
*B29C 63/02* (2006.01)
*H04M 1/02* (2006.01)
*B29L 31/34* (2006.01)
*B29C 63/00* (2006.01)

(52) U.S. Cl.
CPC ......... *B29C 2063/0008* (2013.01); *B29L 2031/3437* (2013.01); *B29L 2031/3475* (2013.01)

(56) References Cited

U.S. PATENT DOCUMENTS

| | | | |
|---|---|---|---|
| 8,905,107 B2 | 12/2014 | Patel et al. | |
| D740,626 S † | 10/2015 | Chen | |
| 2010/0104814 A1 | 4/2010 | Richardson et al. | |
| 2012/0037536 A1 | 2/2012 | Lonsdale, II et al. | |
| 2012/0110868 A1* | 5/2012 | Abbondanzio | B29C 63/0004 33/645 |
| 2012/0211168 A1* | 8/2012 | Patel | B29C 63/0004 156/391 |
| 2012/0211171 A1 | 8/2012 | Patel et al. | |
| 2013/0020005 A1* | 1/2013 | Koblick | B29C 63/0004 156/60 |
| 2013/0020020 A1* | 1/2013 | Liu | B29C 63/02 156/247 |
| 2013/0292269 A1 | 11/2013 | Tages | |
| 2014/0130971 A1* | 5/2014 | Wu | H05K 13/00 156/249 |
| 2015/0000831 A1 | 1/2015 | Wang | |

FOREIGN PATENT DOCUMENTS

| | | |
|---|---|---|
| GB | 2496610 | 5/2013 |
| KR | 101103436 | 1/2012 |
| KR | 101135144 | 4/2012 |
| KR | 1020120047576 | 5/2012 |
| KR | 101335762 | 12/2013 |

OTHER PUBLICATIONS

European Search Report dated Jun. 5, 2014 in corresponding GB Application No. 1400080.6.
European Search Report dated Jun. 16, 2014 in corresponding GB Application No. 1400082.2.
International Search Report and Written Opinion dated Mar. 5, 2015 in corresponding International Application No. PCT/GB2014/053733.
Extended European Search Report dated Mar. 18, 2015 in corresponding European Application No. 14 198 593.7.
First Notification of Office Action for Chinese Application No. 201410851125.5, Sep. 5, 2016, Beijing Sanyou Intellectual Property Agency Ltd., Beijing, CN.
Tylt, Alin Perfect Alignment Screen Protector, Dec. 6, 2013.†

\* cited by examiner
† cited by third party

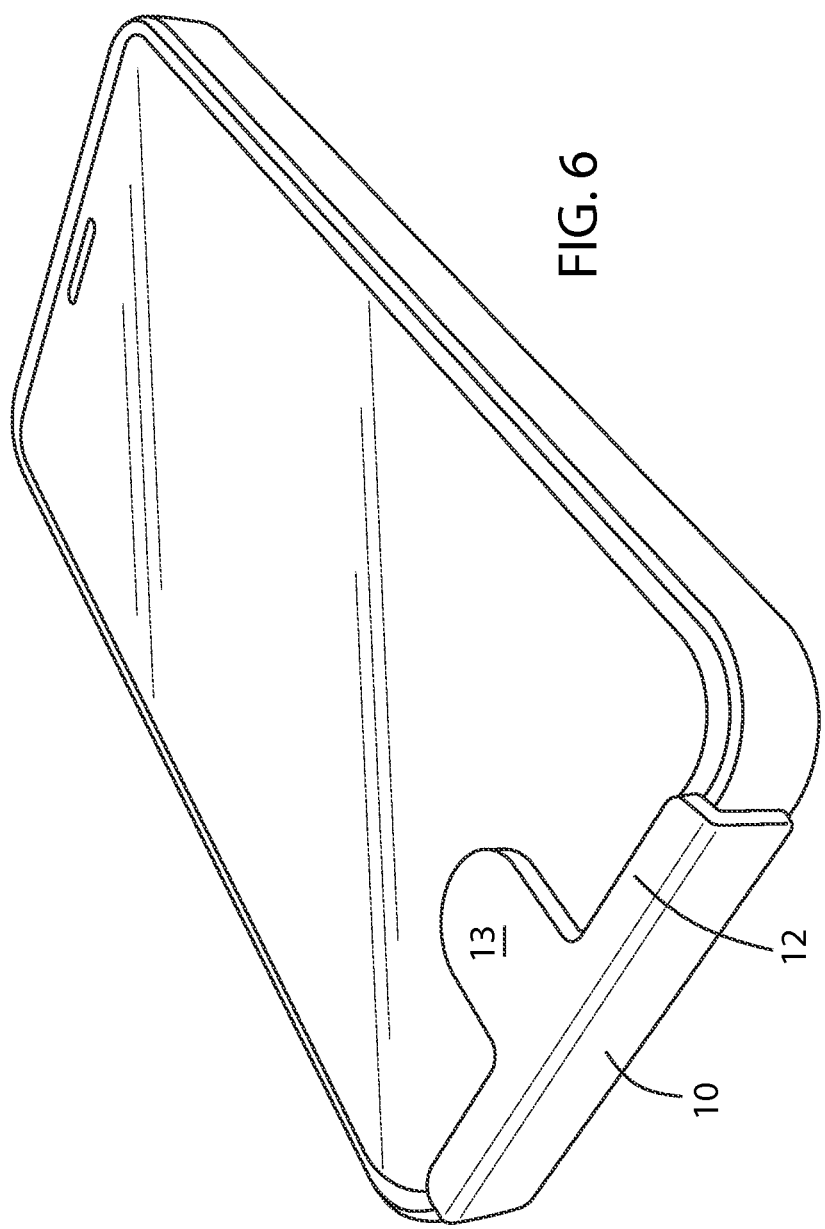

APPLICATOR

The present invention relates to an applicator for aligning a screen protector on a portable electronic device with a screen. Such devices include tablets, smartphones and e-readers.

Screen protectors are available for such devices in the form of a layer of protective transparent plastics material and an adhesive layer allowing the screen protector to be stuck to the screen. It is difficult to correctly align the screen protector with the device. This is important not only for the appearance of the device, but also to ensure various components which are exposed on the screen side of the device such as speakers, microphones, camera lenses, light sensors and fingerprint readers are not obstructed by the screen protector. Often it can take more than one attempt for a user to correctly align the screen protector which results in excess dirt building up on the adhesive layer, degradation of the adhesive layer and, in many cases, the screen protector will have to be thrown away.

In an effort to assist in the alignment process, a number of devices have been proposed. One of these is the "Easy Install Frame" sold by Belkin. This takes the form of a frame which is of a size which can be fitted over the face of the device. The screen protector, together with its backing film, are adhered to one edge of the frame prior to sale. The frame and screen protector are then fitted over the face of the device. The screen protector is then lifted up effectively being pivoted about the edge at which it is adhered to the frame, the backing material is removed and the screen protector is adhered to the screen. This is then detached from the frame and the frame is detached from the device and disposed of. It is wasteful to discard such a relatively large component which has been used only once. However, a bigger problem is that the screen protector and frame must be assembled together prior to sale. Given that the two components will typically be made in different factories, it is time-consuming to bring these together and then for a factory worker to manually align the two components and stick them together.

A second such device is manufactured by PureTEK as the "Roll-on Kit™". This device comprises a tray into which the device is placed so as to be in the correct alignment. A roller is provided at one end of the tray which, following the removal of the backing material from the screen protector is rolled across the surface of the device in order to apply the screen protector to the screen. The tray requires even more material than the above described frame and the roller and its associated mechanism further complicates the assembly and application processes even more than for the frame.

US 2013/0020005 discloses an applicator to which a screen protector is stuck prior to application. A user then aligns the applicator via a projection on the applicator which engages with a socket in the device. Once in place, pressure on the applicator deflects part of the applicator such that the screen protector is applied to the screen. This suffers from a number of drawbacks. Firstly, the screen protector must be applied to the applicator in the correct alignment. This suffers from the above-mentioned problem that the components are likely to be made in different factories. It also requires the components to be correctly aligned. There is also a practical problem in that the backing material is removed from the screen protector prior to engagement between the applicator and the device. The direction of application of the applicator is such that the screen protector needs to be in very close proximity to the screen as it is effectively moved across the face of the device. This provides ample opportunity for it to catch on the screen before it has reached the correct location.

Another such applicator is manufactured by Tylt known as the ALIN applicator. This has a long side which engages with a long edge of the device and two short sides extending away from the long side. It also has a protrusion which is arranged to engage with the edge of the device opposite to the long side. The protrusion is deflected downwardly to allow the device to be pushed into the applicator whereupon once the protrusion is clear of the opposite edge of the device and snaps back into place. This is again a bulky device and the application process is relatively cumbersome.

There is therefore a need for an applicator which can assist in the correct alignment of a screen protector to a device which is simpler and less wasteful than those of the prior art.

According to a first aspect of the present invention, there is provided an applicator for aligning a screen protector on a portable electronic device with a screen, four edges and a rear face opposite to the screen, the applicator comprising a body with an engagement member and an alignment feature, the engagement member being arranged for edgewise engagement with no more than three of the four edges of the device to align the applicator with the device by movement in a direction generally parallel to the plane of the screen such that the alignment feature covers a portion of the face of the device comprising the screen which is not covered by the screen protector allowing an edge of the screen protector to be located with respect to the alignment feature.

The present invention takes a very different approach to most of the prior art in that it has an applicator which is arranged for edgewise engagement with the device. This removes the need for the full frame or the tray of the prior art. In the absence of a frame, the applicator has an alignment feature which covers the portion of the face of the device. This feature is designed to be complementary to a corresponding feature on the screen protector to ensure correct location. By engaging with no more than three of the four sides of the device, the applicator does not need to extend fully across the device in the manner of the Tylt ALIN product thereby providing a significant material saving.

The alignment feature may be any feature which, with the applicator engaged is positioned on the face of the device with the screen so that an edge of the screen protector can engage in the correct location. In a broader sense, this may simply be a straight edge which can align the screen protector in one direction. Preferably, however, the alignment feature has a more complex shape which is capable of aligning the screen protector in two directions. This may take the form of a bulge extending from an edge of the body with which a cut-out portion of the screen protector may engage.

As well as the bulge extending from the edge of the body, the alignment feature preferably also comprises at least one straight edge which covers a portion of the face of the device comprising the screen. Preferably there are two straight edges each extending in opposing directions away from the bulge. The straight edge or edges allow an initial alignment with a straight edge of the screen protector, while the bulge aligns with a complimentary cut out portion in the screen protector as the portion of the screen protector adjacent to the straight edge is brought into engagement with the surface of the device.

As an alternative to or in addition to providing a bulge, the alignment feature may comprise more than one edge, each edge being arranged to align the screen protector in a different direction. Most conveniently, such an alignment feature will be arranged to extend across one edge of the body of the device and along one or both adjacent sides of the device. Such an alignment member is particularly suitable for a device which does not have a feature on the screen which is not to be covered by the screen protector, such that there is no cut-out portion at the edge of the screen protector with which the alignment feature can engage.

For the purpose of this disclosure, the device can generally be considered to have a flat rectangular configuration (although some degree of rounding of edges and faces is usual). This has a front face with a screen and an opposite rear face. Such devices are generally intended to be used both in a landscape and a portrait orientation. For the purposes of this disclosure, with the device in a portrait orientation, the shorter edge at the top of the device will be referred to as the top edge, the opposite edge is the bottom edge and the long edges running between these two are the side edges.

The applicator may be configured to fit on one of the side edges. However, it is more convenient and requires less material if the applicator is arranged to fit on the top or bottom edge. Preferably it is arranged to fit over the bottom edge as this is typically the portion of the device (particularly for a smart phone) which has the most prominent feature such as the "home" button or a microphone, with the screen protector being provided with a cut-out portion in the vicinity of this feature so that the screen protector does not cover this.

The applicator may be arranged to be fitted by presenting it to the top or bottom edge of the device, with the engagement member being arranged to engage with the adjacent side edges of the device so as to align the applicator with respect to the device.

In this case, the applicator preferably has a rear face to engage the rear face of the device, side faces extending away from the rear face to engage the side edges of the device and a bottom face extending away from the rear face and between the side faces, the alignment member projecting from a portion of an edge of the bottom face opposite to the rear face and being in a plane parallel to the rear face.

This applicator needs only to be large enough that the side faces can engage with the edges of the device to ensure a reliable alignment. However, the rear face may have a slot extending substantially across its full width for supporting the device in an upstanding configuration. This allows the applicator to be used as a stand such that it does not need to be thrown away once the screen protector has been aligned. In this case, the face opposite to the bottom face is preferably open. For any device which has speakers in its bottom edge, this channels the sound from the device.

The applicator preferably has a release tab projecting away from the alignment member, the depression of which tab causes the alignment member to move away from the screen. This release tab allows the applicator to be made a tighter fit with the device thereby improving alignment while still making it easy to detach once the screen protector has been fitted.

An applicator which engages with the side edges of the device is particularly suitable for small devices such as smart phones. However, for larger devices such as tablets, this will result in a reasonably large applicator as it will have to extend for the full width of the device.

As an alternative, therefore, the engagement feature is arranged to engage with a port in the edge of the device. This may, for example, be the port of the headphone jack, or the port for the charger plug. For added stability, it may engage with more than one port. This feature may also be provided in addition to the engagement member which engages the side of the device.

According to a second aspect of the present invention, there is provided an applicator for aligning a screen protector on a portable electronic device with a screen, the applicator comprising a body with an engagement member and an alignment feature, the engagement member being arranged for edgewise engagement with the device without any deflection of the applicator to align the applicator with the device by movement in a direction generally parallel to the plane of the screen such that the alignment feature covers a portion of the face of the device comprising the screen which is not covered by the screen protector allowing an edge of the screen protector to be located with respect to the alignment feature.

Because the applicator is applied simply by being moved in a direction generally parallel to the plane of the screen without any deflection, this is a very simple application process which readily brings the applicator into the correct position.

According to a third aspect of the present invention, there is provided a combination of an applicator according to the first or second aspect of the present invention and a screen protector, the screen protector having a feature which is complementary to the alignment feature of the applicator. The feature may be an edge of the screen protector or a cut-out feature in an edge.

According to a fourth aspect of the present invention, there is provided a pack which includes a combination of applicator and screen protector according to the third aspect of the present invention, the applicator and screen protector being unattached in the pack.

According to a fifth aspect of the present invention, there is provided a combination of a portable electronic device and an applicator according to a first or second aspect of the present invention, the device having a flat substantially rectangular shape, having a front face with a screen and an opposite rear face, top and bottom short edges and two longer side edges running therebetween, the applicator being fitted to one edge such that the alignment feature covers a portion of the front face that is not to be covered by a screen protector.

According to a fifth aspect of the present invention, there is provided a method of applying a screen protector to a portable electronic device, the device having a flat substantially rectangular shape with a front face with a screen and an opposite rear face, top and bottom short edges and two longer side edges running therebetween, the method comprising presenting an applicator according to a first or second aspect of the present invention in an edgewise direction to one of the edges of the device, fitting the applicator to the edge of the device such that the engagement member aligns it so that the alignment feature covers a portion of the front face that it not to be covered by a screen protector, positioning a screen protector with respect to the applicator and screen such that a feature on the screen protector aligns with the alignment feature, and adhering the screen protector to the screen.

The method is preferably carried out without ever adhering the screen protector to the applicator.

Examples of applicators in accordance with the present invention will now be described in the reference of the accompanying drawings, in which.

Figure 4:
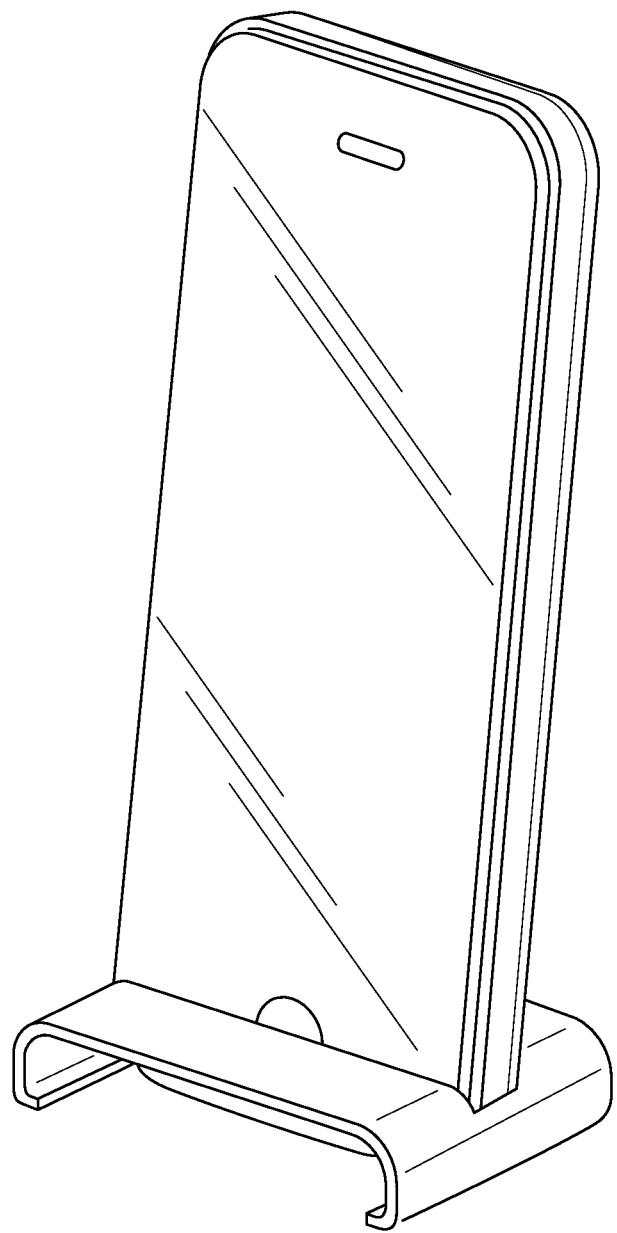
Figure 5:
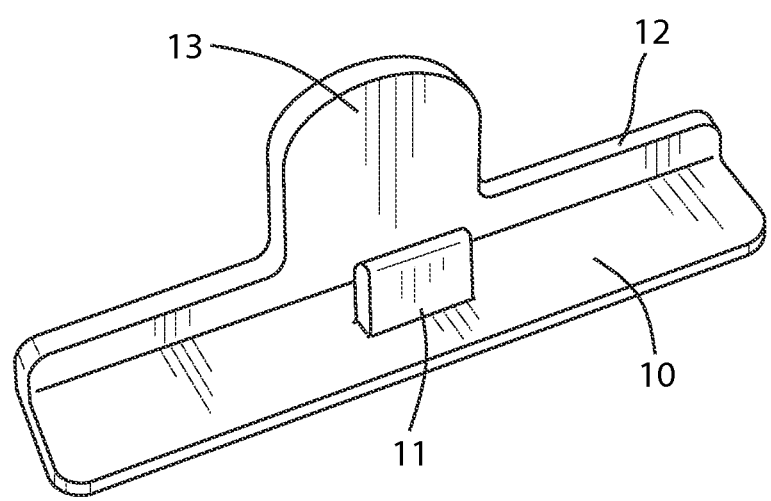

FIGS. 3A-D show various stages of the use of the first applicator;

FIG. 4 shows alternative views of the first applicator;

FIG. 5 is a perspective view of a second applicator; and

FIG. 6 is a perspective view of the second applicator in use.

The first example is described with reference to FIGS. 1 to 4 is one which is designed to align with the side edges of a device. The device is designed to fit over approximately the end third of the device.

The applicator comprises a rear face 1 which engages in use with a rear face of a device. Side faces 2 extend upwardly at opposite sides of the rear face. A lip 3 extends inwardly from an upper edge of each side face 2. A bottom face 4 extends upwardly from the rear face 1 between the side faces 2 and the lip 3 continues across the bottom face 4. A substantially circular bulge 5 extends inwardly from the lip 3. A release tab 6 extends in the opposite direction to the bulge 5. A slot 7 extends across the rear face 1 between the two side faces 2.

Figure 3A:
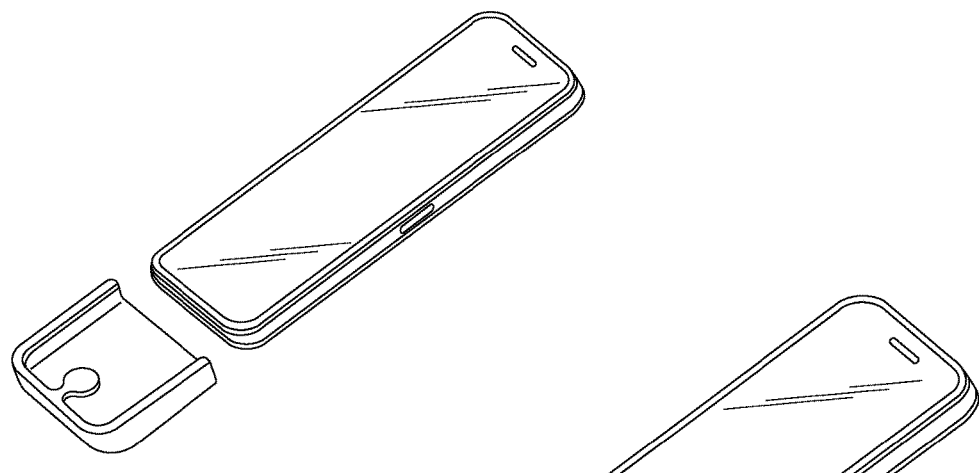
Figure 3B:
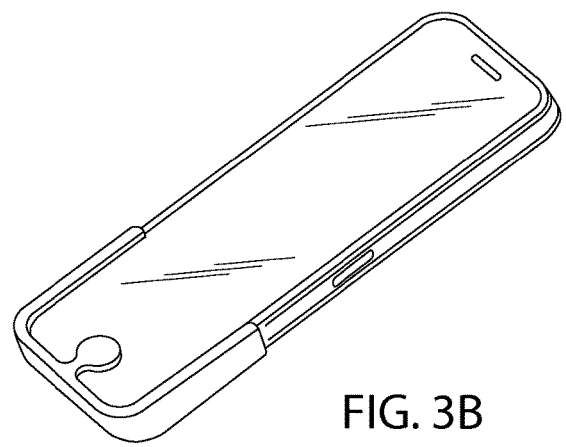
Figure 3C:
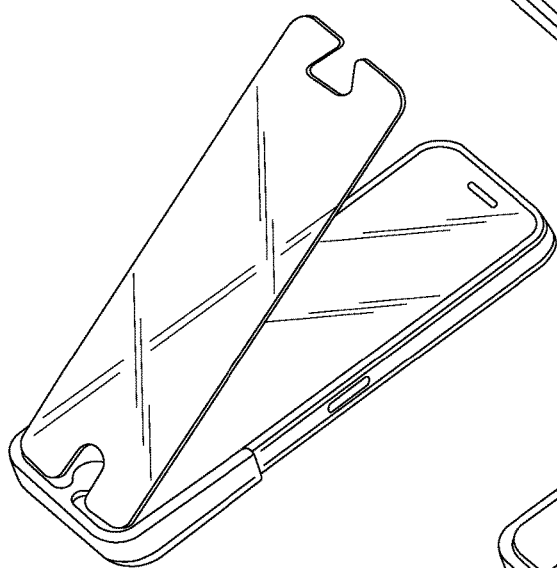
Figure 3D:
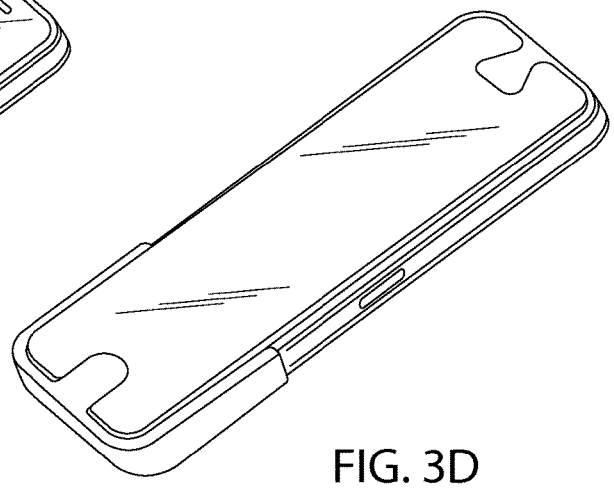

In order to fit the applicator to a device D, it is presented to an edge of the device (in this case the bottom edge) as shown in FIG. 3A and is slid in an edgewise direction onto the device into the position shown in FIG. 3B in which the side faces 2 engage with the edges of the device D in order to ensure that it is correctly aligned. When fully fitted, the bulge 5 covers the home button B of the device D as shown in FIG. 3B. The screen protector S as shown in FIG. 3C has a cut-out portion C at its lowermost edge which is complementary with the bulge 5. The edge of the screen protector adjacent to the cut-out C is placed against the lip 3 in the vicinity of the bulge 5 as shown in FIG. 3C so that this edge can be correctly aligned. The screen protector S is then allowed to flex so that just the portion of the screen protector in the vicinity of the cut-out C engages with the screen. The cut-out should fit closely around the bulge 5. If not, it can be adjusted by the user without most of the protector having been adhered to the screen. If so, once it is correctly aligned the screen protector can be adhered to the rest of the screen safe in the knowledge that it is now correctly aligned. Any cut out portion in the protector for features at the opposite end of the device will automatically fall into the correct place. This is generally done by bending the screen protector so that it progressively adheres to the screen from the bottom up until it reaches the fully installed position as shown in FIG. 3D. The applicator can then be removed.

The bulge 5 may be absent, in which case the lip 3 on its own can align the screen protector in the manner described above. This arrangement is particularly suitable for a device which does not have a home button or some other feature for which the screen protector is provided with a cut-out portion.

Figure 1:
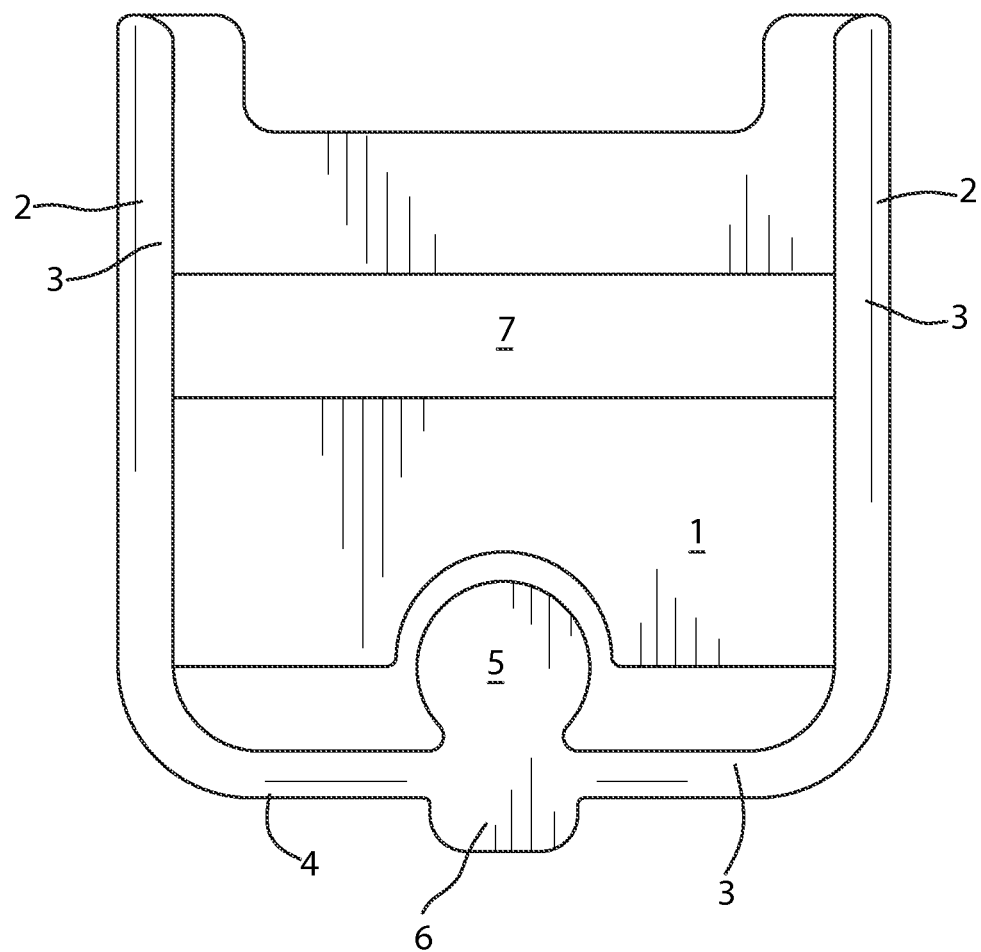
FIG. 1 is a top view of a first applicator.
Figure 2:
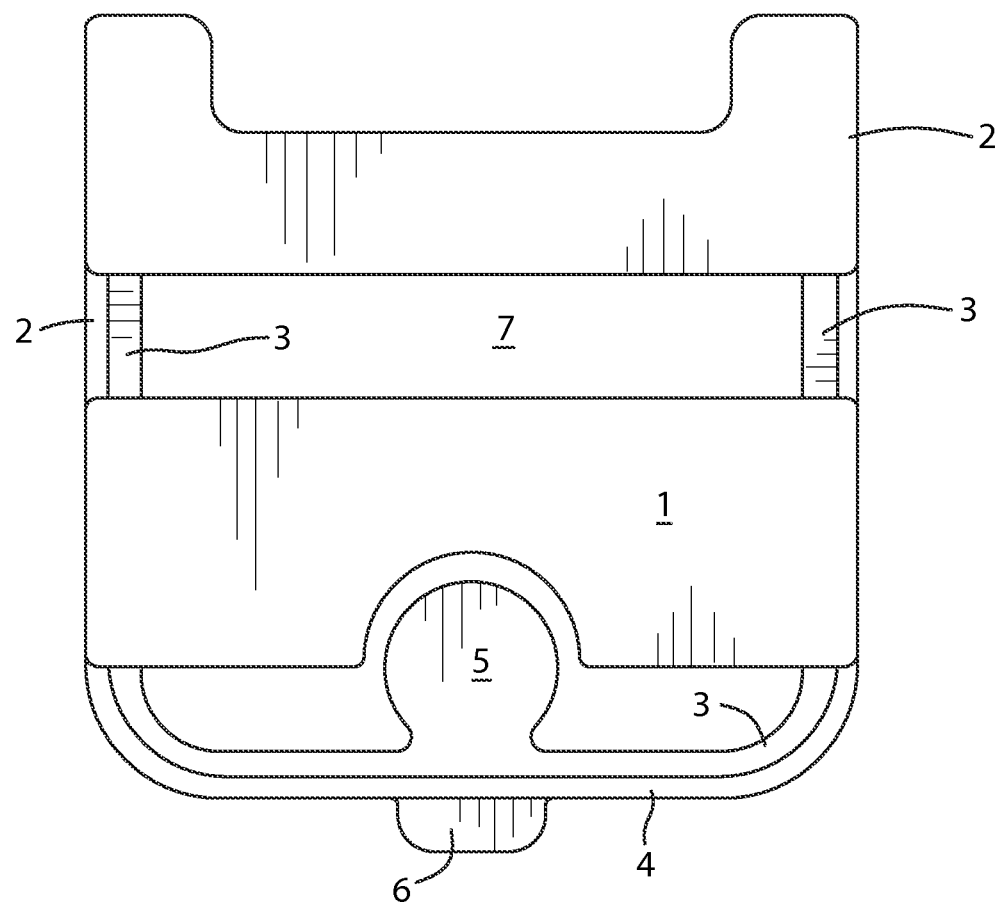
FIG. 2 is a rear view of the first applicator.

As shown in FIG. 4, the applicator may then be inverted into the position shown in FIG. 2 such that the slot 7 can receive the device D in an upstanding configuration. The applicator has an open end 8 which will act as an amplifier if the device has speakers at its lower end.

FIGS. 5 and 6 show a second example of an applicator. This has a much simpler form and is generally suitable for wider devices such as tablets in which it is less practical to provide a device which engages with the side edges. This second applicator has a base 10 with an upstanding projection 11 in a central portion arranged to engage the port in the device. In this case, it is designed to engage with the charging port, but could equally be arranged to fit any other port such as the port for the headphone jack. Alternatively, there could be two or more projections arranged to fit in two or more ports. At one edge of the base 10 is an upstanding lip 12 from the centre of which a bulge 13 extends away from the base 10. In this case, the alignment feature 13 is a rectangular portion with a semi-circular top. However, this may be of any shape depending upon the feature in the device that it is designed to cover.

In order to use the second applicator, it is presented to the edge of the device with the projection 11 inserted into the appropriate port such that alignment feature 13 covers the appropriate feature on the device as shown in FIG. 6. The procedure for fitting a screen protector is as described with relation to the first example. In this case, the applicator has no second function. However, this is of less concern as it is a very small component.

The invention claimed is:

1. An applicator for aligning a screen protector on a portable electronic device with a screen, four edges and a rear face opposite to the screen, the applicator comprising a single piece body with both an engagement member and an alignment feature, the engagement member being arranged for edgewise engagement with no more than three of the four edges of the device to align the applicator with the device by movement in a direction generally parallel to the plane of the screen such that the alignment feature covers a portion of the face of the device comprising the screen which is not covered by the screen protector allowing an edge of the screen protector to be located with respect to the alignment feature, wherein the alignment feature is a bulge extending from an edge of the body.

2. The applicator as claimed in claim 1, wherein the alignment feature is capable of aligning the screen protector in two directions.

3. The applicator according to claim 1, wherein the alignment feature further comprises at least one straight edge adjacent to the bulge which covers a portion of the face of the device comprising the screen.

4. The applicator according to claim 3, wherein there are two straight edges each extending in opposing directions away from the bulge.

5. The applicator according to claim 2, wherein the alignment feature comprises more than one edge, each edge being arranged to align the screen protector in a different direction.

6. The applicator according to claim 1, wherein the applicator is arranged to fit on a top or bottom edge of the device.

7. The applicator according to claim 6, wherein the applicator is arranged to be fitted by presenting it to a top or bottom edge of the device, with the engagement member being arranged to engage with the adjacent side edges of the device so as to align the applicator with respect to the device.

8. The applicator according to claim 7, wherein the applicator has a rear face to engage the rear face of the device, side faces extending away from the rear face to engage the side edges of the device and a bottom face extending away from the rear face and between the side faces, the alignment member projecting from a portion of an edge of the bottom face opposite to the rear face and being in a plane parallel to the rear face.

9. The applicator according to claim 8, wherein the rear face has a slot extending substantially across its full width for supporting the device in an upstanding configuration.

10. The applicator according to claim 9, wherein the face opposite to the bottom face is open.

11. The applicator according to claim 1, wherein the applicator has a release tab projecting away from the alignment feature, wherein depression of the release tab causes the alignment feature to move, in use, away from the screen.

12. The applicator according to claim 1, wherein the engagement member is arranged to engage with a port in the edge of the device.

13. An applicator for aligning a screen protector on a portable electronic device with a screen, the applicator comprising a single piece body with both an engagement member and an alignment feature, the engagement member being arranged for edgewise engagement with the device without any deflection of the applicator to align the applicator with the device by movement in a direction generally parallel to the plane of the screen whereby the alignment feature covers a portion of the face of the device comprising the screen which is not covered by the screen protector allowing an edge of the screen protector to be located with respect to the alignment feature.

14. A combination of the applicator according to claim 13 and a screen protector, the screen protector having a feature which is complementary to the alignment feature of the applicator.

15. A pack which includes a combination of the applicator and screen protector according claim 14, the applicator and screen protector being unattached in the pack.

16. A combination of a portable electronic device and the applicator according to claim 13, the device having a flat substantially rectangular shape, having a front face with a screen and an opposite rear face, top and bottom short edges and two longer side edges running there between, the applicator being fitted to one edge such that the alignment feature covers a portion of the front face that is not to be covered by a screen protector.

17. A method of applying a screen protector to a portable electronic device, the device having a flat substantially rectangular shape with a front face with a screen and an opposite rear face, top and bottom short edges and two longer side edges running there between, the method comprising presenting an applicator according to claim 13 in an edgewise direction to one of the edges of the device, fitting the applicator to the edge of the device such that the engagement member aligns it whereby the alignment feature covers a portion of the front face that is not to be covered by a screen protector, positioning a screen protector with respect to the applicator and screen such that a feature on the screen protector aligns with the alignment feature, and adhering the screen protector to the screen.

18. The method according to claim 17 carried out without ever adhering the screen protector to the applicator.

19. A combination of the applicator according to claim 1 and a screen protector, the screen protector having a feature which is complementary to the alignment feature of the applicator.

20. A pack which includes a combination of the applicator and the screen protector according claim 19, the applicator and screen protector being unattached in the pack.

21. A combination of a portable electronic device and the applicator according to claim 1, the device having a flat substantially rectangular shape, having a front face with a screen and an opposite rear face, top and bottom short edges and two longer side edges running therebetween, the applicator being fitted to one edge such that the alignment feature covers a portion of the front face that is not to be covered by a screen protector.

22. A method of applying a screen protector to a portable electronic device, the device having a flat substantially rectangular shape with a front face with a screen and an opposite rear face, top and bottom short edges and two longer side edges running therebetween, the method comprising presenting an applicator according to claim 1 in an edgewise direction to one of the edges of the device, fitting the applicator to the edge of the device such that the engagement member aligns it so that the alignment feature covers a portion of the front face that is not to be covered by a screen protector once the applicator is in place on the device, positioning a screen protector onto the device against an edge of the applicator and screen such that a feature on the screen protector aligns with the alignment feature, and adhering the screen protector to the screen.

23. A method according to claim 22 carried out without ever adhering the screen protector to the applicator.

24. An applicator for aligning a screen protector on a portable electronic device with a screen, four edges and and a rear face opposite to the screen, the applicator comprising a single piece body with both an engagement member and an alignment feature, the engagement member being arranged for edgewise engagement with no more than three of the four edges of the device to align the applicator with the device by movement in a direction generally parallel to the plane of the screen such that the alignment feature covers a portion of the face of the device comprising the screen which is not covered by the screen protector allowing an edge of the screen protector to be located with respect to the alignment feature, and wherein the alignment feature is capable of aligning the screen protector in two directions;

wherein the alignment feature is capable of aligning the screen protector in two directions; and wherein the alignment feature comprises more than one edge, each edge being arranged to align the screen protector in a different direction.

* * * * *